United States Patent
Smith

(10) Patent No.: US 7,263,837 B2
(45) Date of Patent: Sep. 4, 2007

(54) THERMOACOUSTIC COOLING DEVICE

(75) Inventor: Barton L. Smith, Logan, UT (US)

(73) Assignee: Utah State University, North Logan, UT (US)

( * ) Notice: Subject to any disclaimer, the term of this patent is extended or adjusted under 35 U.S.C. 154(b) by 311 days.

(21) Appl. No.: 10/811,479

(22) Filed: Mar. 25, 2004

(65) Prior Publication Data

US 2004/0231341 A1    Nov. 25, 2004

Related U.S. Application Data

(60) Provisional application No. 60/457,619, filed on Mar. 25, 2003.

(51) Int. Cl.
*F25B 9/00* (2006.01)
*B21D 53/02* (2006.01)
*H05K 7/20* (2006.01)

(52) U.S. Cl. .......................... 62/6; 29/890.03; 361/694

(58) Field of Classification Search ................. 62/6, 62/259.2; 29/890.03; 361/690, 694
See application file for complete search history.

(56) References Cited

U.S. PATENT DOCUMENTS

| | | | |
|---|---|---|---|
| 4,599,551 A | 7/1986 | Wheatley et al. | |
| 4,625,517 A | 12/1986 | Müller | |
| 4,722,201 A | 2/1988 | Hofler et al. | |
| 4,858,441 A | 8/1989 | Wheatley et al. | |
| 4,948,360 A | 8/1990 | Wells | |
| 5,006,060 A * | 4/1991 | Wells | 431/1 |
| 5,146,750 A | 9/1992 | Moscrip | |
| 5,165,243 A * | 11/1992 | Bennett | 62/6 |
| 5,303,555 A * | 4/1994 | Chrysler et al. | 62/6 |
| 5,329,768 A | 7/1994 | Moscrip | |
| 5,369,625 A * | 11/1994 | Gabrielson | 367/140 |
| 5,412,950 A | 5/1995 | Hu | |
| 5,435,136 A | 7/1995 | Ishizaki et al. | |
| 5,456,082 A * | 10/1995 | Keolian et al. | 62/6 |
| 5,465,578 A | 11/1995 | Barben et al. | |

(Continued)

OTHER PUBLICATIONS

Smith et al., "Controlled Interactions of Adjacent Synthetic Jets," AIAA 99-0669: American Institute of Aeronautics and Astronautics Inc., pp. 1-21, 1999.

(Continued)

*Primary Examiner*—William C. Doerrler
(74) *Attorney, Agent, or Firm*—Clayton, Howarth & Cannon, P.C.

(57) ABSTRACT

A thermoacoustic cooling system for cooling an object such as a microelectronic chip. Heat produced by the object is transferred to a thermoacoustic engine. The thermoacoustic engine may include a resonator defining a chamber. A stack may be positioned in the chamber with one side of the stack adjacent to the heat source, and the opposite side of the stack adjacent to air in the chamber having a relatively cooler temperature. One or more orifices may be formed in the resonator such that the acoustic power generated by the thermoacoustic engine creates a synthetic jet to circulate air and move the air away from the object being cooled. Thus, the heat produced by the object is used to power the thermoacoustic engine to thereby remove heat from the object. The thermoacoustic engine may use no moving parts and may require no external power source other than the object being cooled.

158 Claims, 12 Drawing Sheets

U.S. PATENT DOCUMENTS

| | | | | |
|---|---|---|---|---|
| 5,561,984 | A | * | 10/1996 | Godshalk et al. ............ 62/51.1 |
| 5,673,561 | A | * | 10/1997 | Moss .............................. 62/6 |
| 5,758,823 | A | | 6/1998 | Glezer et al. |
| 5,894,990 | A | | 4/1999 | Glezer et al. |
| 5,901,556 | A | | 5/1999 | Hofler |
| 5,957,413 | A | | 9/1999 | Glezer et al. |
| 5,988,522 | A | | 11/1999 | Glezer et al. |
| 5,996,345 | A | | 12/1999 | Hofler |
| 6,123,145 | A | | 9/2000 | Glezer et al. |
| 6,164,073 | A | | 12/2000 | Swift et al. |
| 6,385,972 | B1 | | 5/2002 | Fellows |
| 6,711,905 | B2 | * | 3/2004 | Howard ........................... 62/6 |
| 2002/0172008 | A1 | | 11/2002 | Michael |

OTHER PUBLICATIONS

Smith et al., "Synthetic Jets at Large Reynolds Number and Comparison to Continuous Jets," AIAA 2001-3030: American Institute of Aeronautics and Astronatuics Inc., pp. 1-19, 2001.

Swift, "Thermoacoustic engines," 84(4): J. Acoust. Soc. Am., pp. 1145-1179, Oct. 1988.

Abdel-Rahman et al., "Size considerations in interfacing thermoacoustic coolers with electronics," in *2002 Inter Society Conference on Thermal Phenomena*, pp. 421-424, 2002.

Raspet et al., "Thremoacoustic sound source in the Helmholtz limit," 96(5): Journal of the Acousitcal Society of America, p. 3221, Nov. 1994.

Rizzetta et al., "Numerical Investigation of Synthetic Jet Flowfields," AIAA 98-2910: American Institute of Aeronautics and Astronatuics Inc., pp. 1-19, 1998.

\* cited by examiner

THERMOACOUSTIC COOLING DEVICE

CROSS-REFERENCE TO RELATED APPLICATIONS

This application claims the benefit of U.S. Provisional Application No. 60/457,619, filed Mar. 25, 2003, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Invention

The present disclosure relates generally to cooling devices, and more particularly, but not necessarily entirely, to cooling devices having thermoacoustic engines for producing synthetic jets.

2. Description of Related Art

It is beneficial to remove heat from certain objects or areas in a variety of products and applications. For example, electronic devices, such as personal computers, servers, cameras, electrical appliances, etc., often have components, such as processors, microchips, or integrated circuits that generate heat. If this heat is not continuously removed, the electronic device may overheat, resulting in damage to the device and/or a reduction in operating performance. In order to avoid such overheating, cooling devices are often used in conjunction with electronic devices. Other non-electrical devices such as mechanical devices, optical devices, etc., may likewise generate heat and benefit from being cooled.

One type of cooling device is a heat sink cooling device. In such a device, the heat sink is formed of a material, such as aluminum, which readily conducts heat. The heat sink is usually placed on top of and in contact with the electronic device. Due to this contact, heat generated by the electronic device is conducted into the heat sink and away from the electronic device.

The heat sink may include a plurality of cooling fins in order to increase the surface area of the heat sink and, thus, maximize the transfer of heat from the heat sink into the surrounding air. In this manner, the heat sink draws heat away from the electronic device and transfers the heat into the surrounding air.

In order to enhance the cooling capacity of a heat sink device, a fan is often mounted within or adjacent to the heat sink. In operation, the fan causes air to move over and around the fins of the heat sink device, thus cooling the fins by enhancing the transfer of heat from the fins into the ambient air.

Over the years, the power of electronic devices has increased and the size of the electronic devices has been reduced. Thus, the power density of the electronic devices has increased as well as the amount of heat generated by these devices. In order to adequately cool these higher powered electronic devices, cooling devices with greater cooling capacities have been required and the reliability of the cooling devices has become increasingly important. Heat sinks alone are often not adequate to cool modern electronic devices so that other cooling mechanisms, such as electrically powered fans, water cooling systems, heat pipes, etc., are required. The cooling mechanisms, in addition to the heat sinks, have become critical components to the reliability of various electronic devices. Fans in particular are subject to failure since they have mechanical and electrical components that can fail. Also, fans require external electrical power which can fail, or which can be depleted when drawn from limited power sources like batteries.

While much work has been done to produce highly reliable, cost competitive fans specifically for the microelectronics industry, many cases exist where the overall system reliability, or system availability, is paramount. In these cases, fans are often fitted with feedback mechanisms and are monitored by the operating system of the machine. The electrically powered fans consume additional electricity and have moving parts that are susceptible to wear and malfunction.

Another problem with fan assisted heat sink cooling devices is the noise generated by the fans, particularly in situations where larger and/or multiple fans are used to achieve increased cooling capacity. This is particularly a problem in desktop computers where users are commonly situated in close proximity to the machine. The problem is further aggravated in situations where multiple electronic devices and multiple cooling devices are mounted in the same computer case, as occurs in many high power computers.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figures 1, 1A:
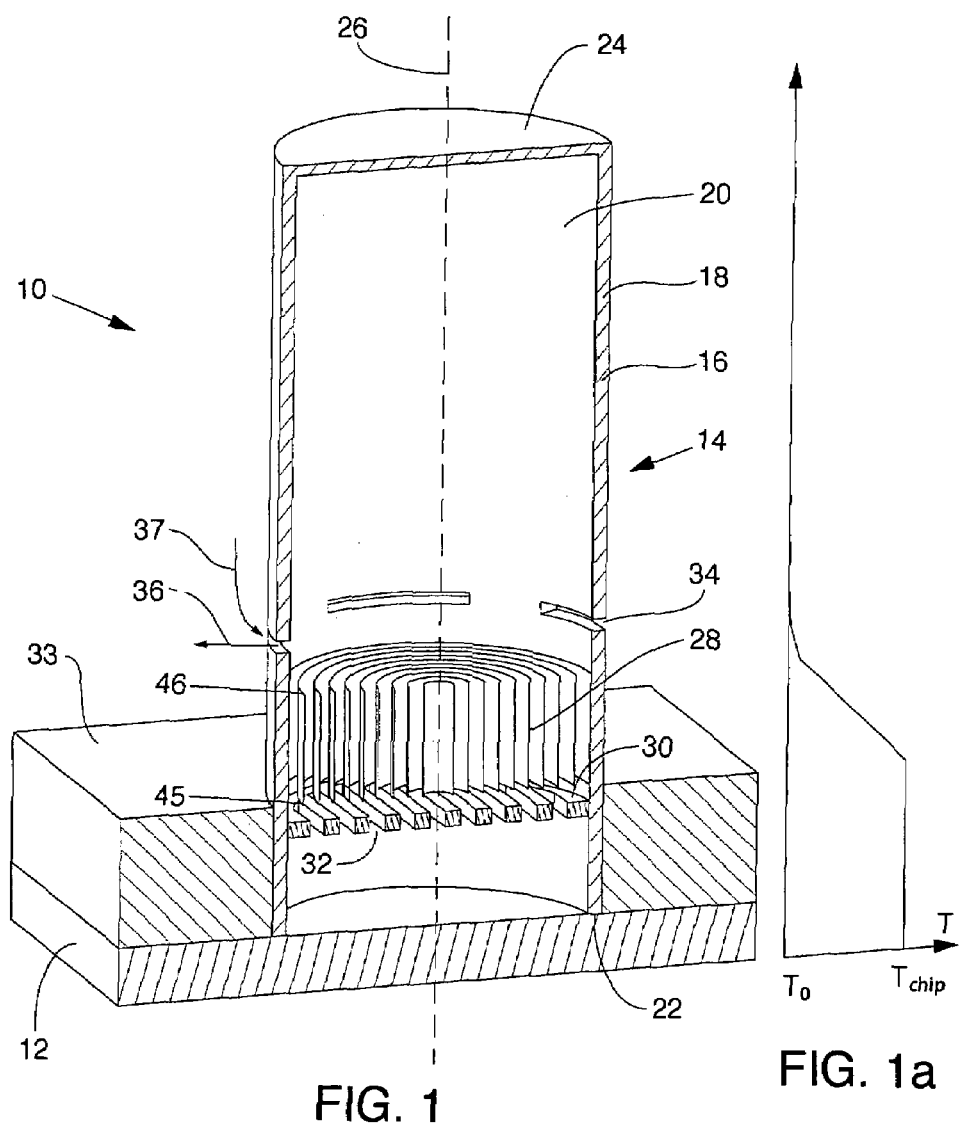
FIG. 1 is a schematic cross-sectional perspective view of a thermoacoustic cooling system.
FIG. 1a is an exemplary graphical representation of the temperature at different points along the thermoacoustic cooling system.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

As used herein, the term "join" means to put or bring together so as to make continuous or form a unit, or to put or bring together into close association or relationship. Accordingly, for example, joining a thermoacoustic engine with an object to be cooled includes situations in which the thermoacoustic engine contacts the object to be cooled, and/or situations in which the thermoacoustic engine is brought into close relationship with an object to be cooled without contact between the thermoacoustic engine and the object to be cooled.

As used herein, the term "transverse" refers to a position of an item that is across or crosswise relative to another item, including any relative position that is non-parallel.

Referring now to FIG. 1, a schematic cross-sectional perspective view of a thermoacoustic cooling system is shown indicated generally at 10. The thermoacoustic cooling system 10 may include an object to be cooled such as a chip 12, that may provide a heat source. It will be appreciated that the thermoacoustic cooling system 10 may also be used to cool any of a variety of objects besides the chip 12, such that any of a variety of heat sources may be used within the scope of the present disclosure. The chip 12 may be defined as an electrical component for carrying out a function. The chip 12 may include electronic components such as microelectronics, integrated circuits, or processors, for example, which may generate heat while carrying out the functions. The chip 12 may be made of a semiconducting material, such as silicon, which may be processed to have specified electrical characteristics. The object to be cooled, such as chip 12, may be formed in various different sizes and configurations within the scope of the present disclosure.

The thermoacoustic cooling system 10 may also include a thermoacoustic engine or device, indicated generally at 14, joined with the object to be cooled, such as the chip 12. The thermoacoustic engine 14, as referred to herein, may be defined as an energy conversion device in which heat flow from a high-temperature source to a low-temperature sink generates acoustic power. Operation of the thermoacoustic engine 14 is described more fully below, and is understood by those having ordinary skill in the relevant art.

Figure 2:
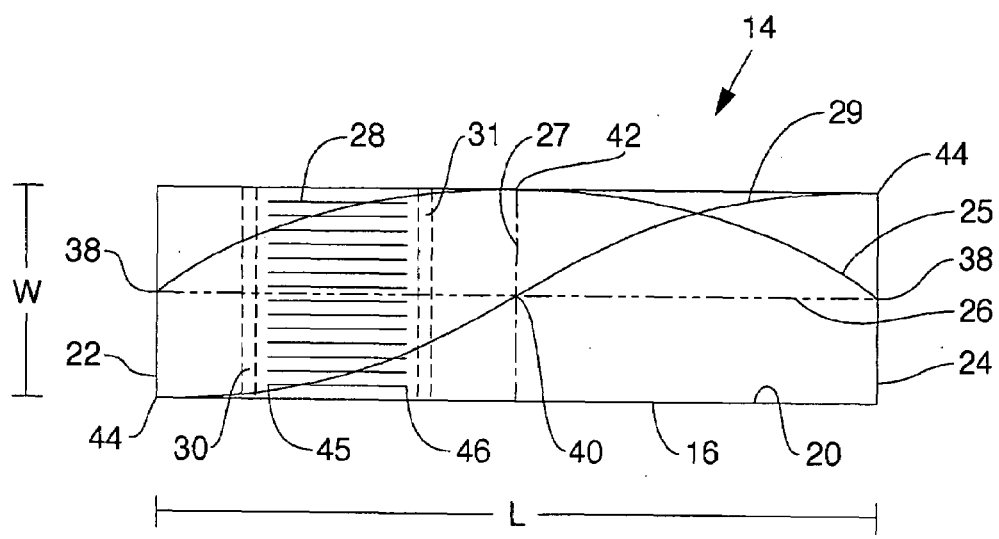
FIG. 2 is a schematic view of a thermoacoustic standing wave engine.

The thermoacoustic engine 14 may include a resonator 16. The resonator 16 may have a first end 22 and a second end 24. Also, the resonator may include a wall 18 defining a chamber 20. The chamber 20 may contain a working fluid, such as air. However, it will be appreciated that other fluids may be used with the thermoacoustic engine 14 within the scope of the present disclosure. The wall 18 of the resonator 16 may form any cross-sectional shape and may have a length L that is longer than a width W of the resonator 16, as depicted in FIG. 2. The length L may be any length and may be a sub-multiple of a wavelength. For example, if both ends of the resonator 16 are open or if both ends of the resonator 16 are closed, the length L may be a multiple of a half of a wavelength, i.e. 0.5, 1, 1.5, etc. If only one end of the resonator 16 is closed and one end of the resonator 16 is open, the length L may be a multiple of a quarter of a wavelength, i.e. 0.25, 0.5, 0.75, etc. It will be understood that the width W may be smaller than the length L, such as a tenth of a wavelength for example. This allows the waves to form in a single direction along the length L of the resonator 16 rather than forming along both the length L and the width W as may occur if the length L and the width W are approximately equal. Accordingly, it will be understood that any of various ratios of length L to width W greater than 1:1 may be used within the scope of the present disclosure.

Figure 1B:
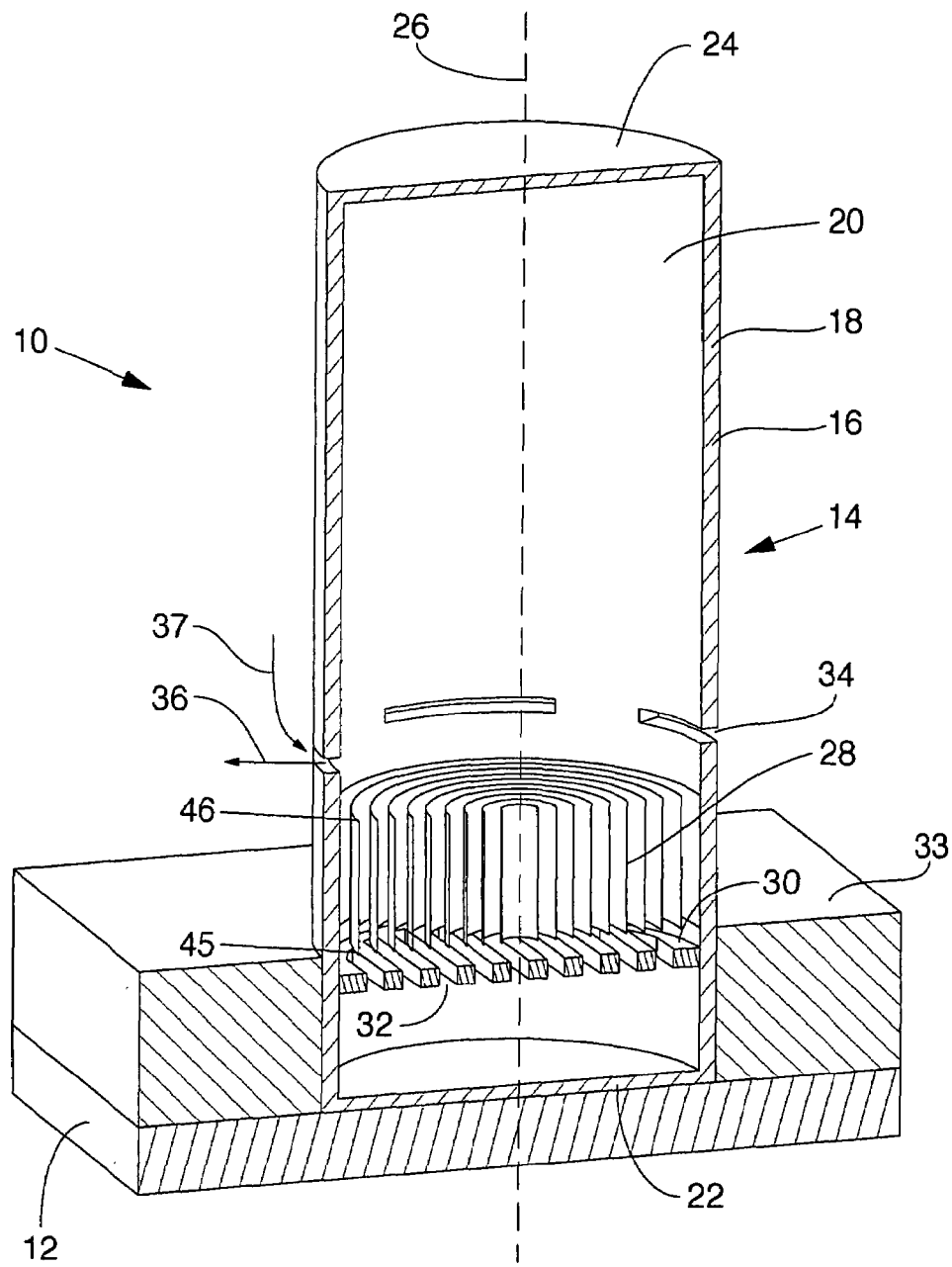
FIG. 1b is a schematic cross-sectional perspective view of an alternative thermoacoustic cooling system with a resonator having closed ends.
Figure 4:
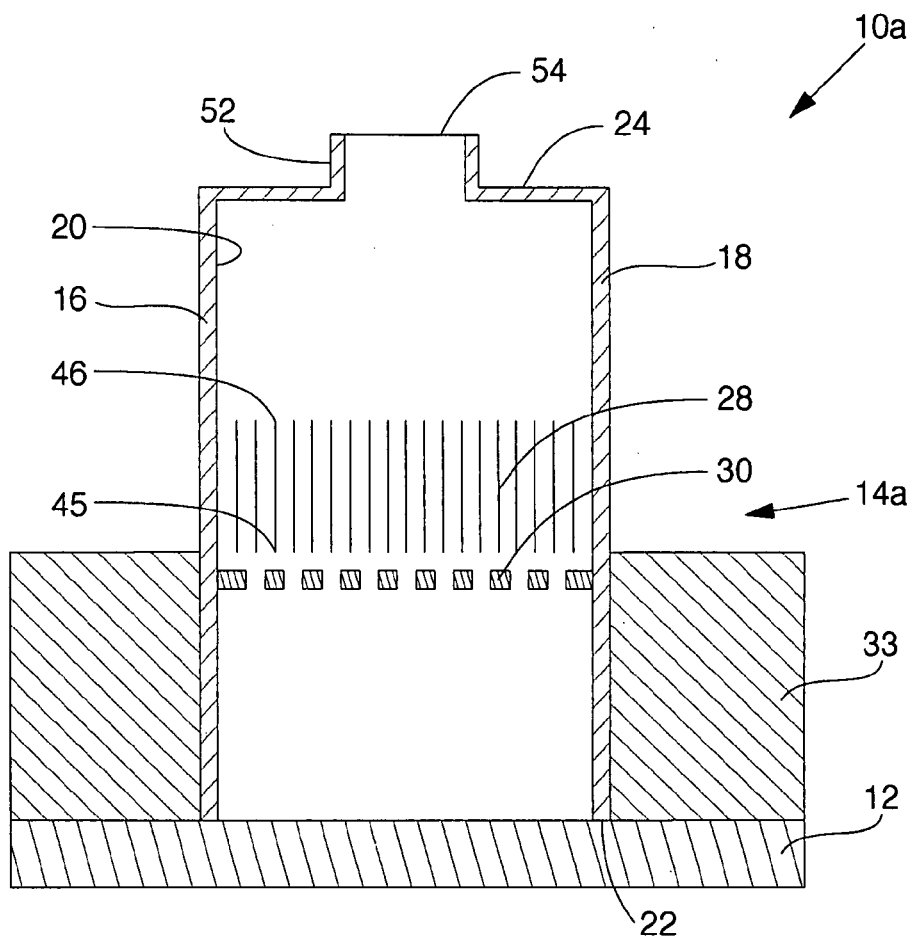
FIG. 4 is a schematic view of an alternative embodiment thermoacoustic engine.
Figure 4A:
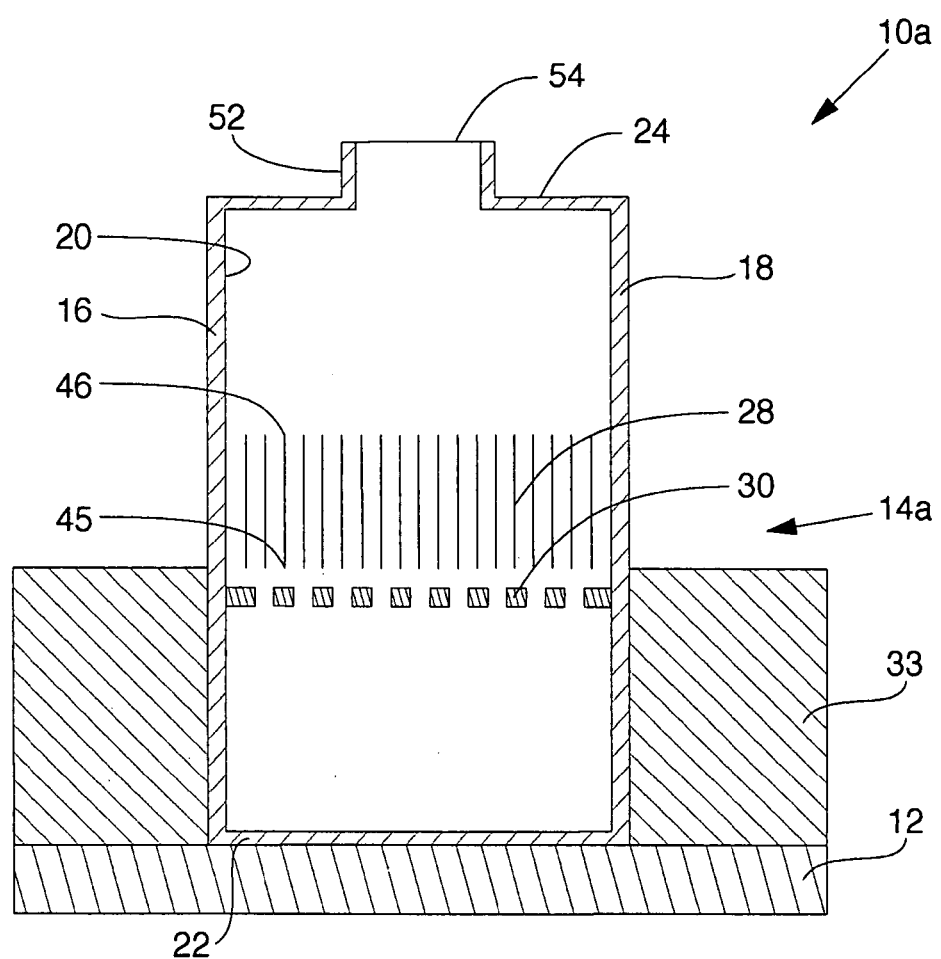
FIG. 4a is a schematic view of the alternative embodiment thermoacoustic engine of FIG. 4 with the resonator having a closed end.
Figure 5:
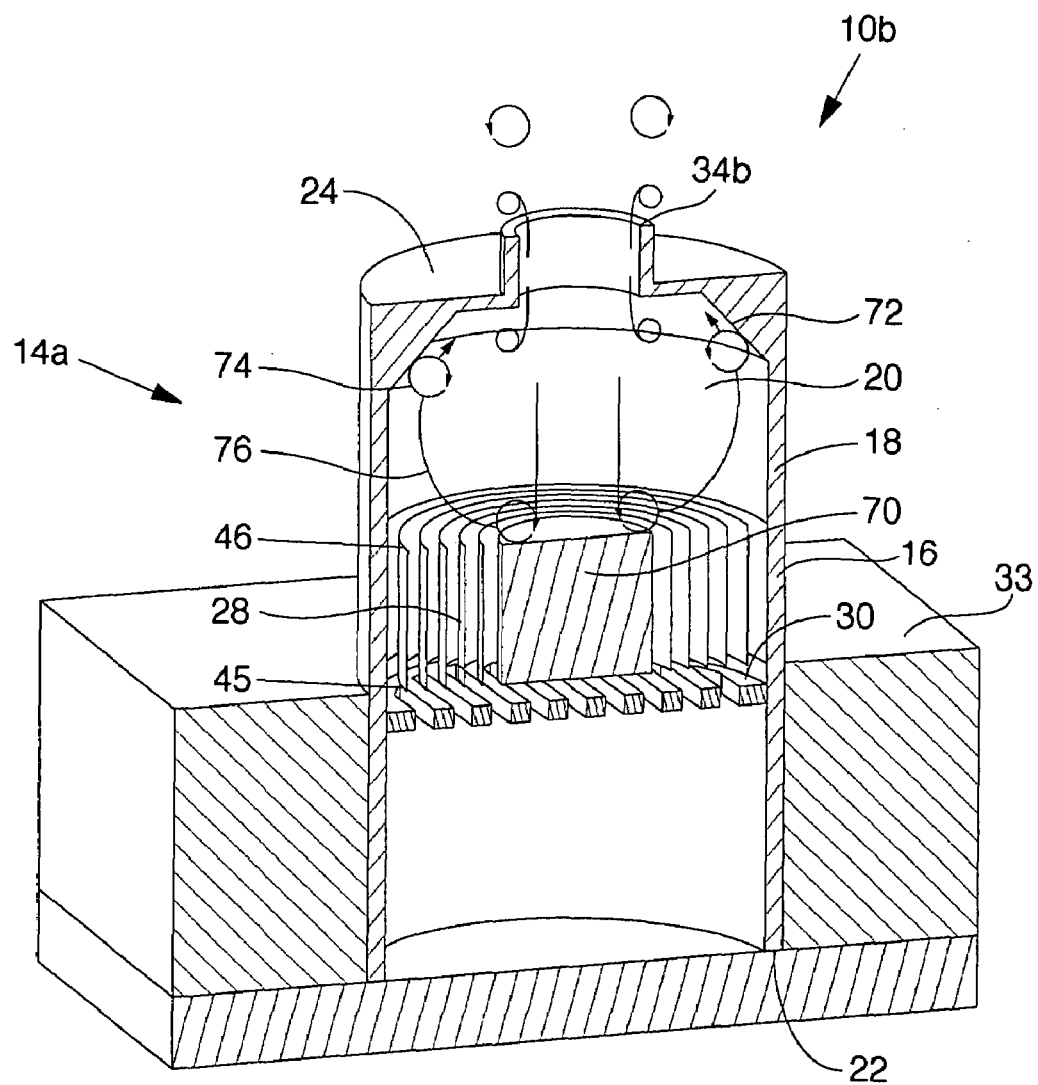
FIG. 5 is a schematic cross-sectional perspective view of an additional alternative embodiment thermoacoustic cooling system.
Figure 5A:
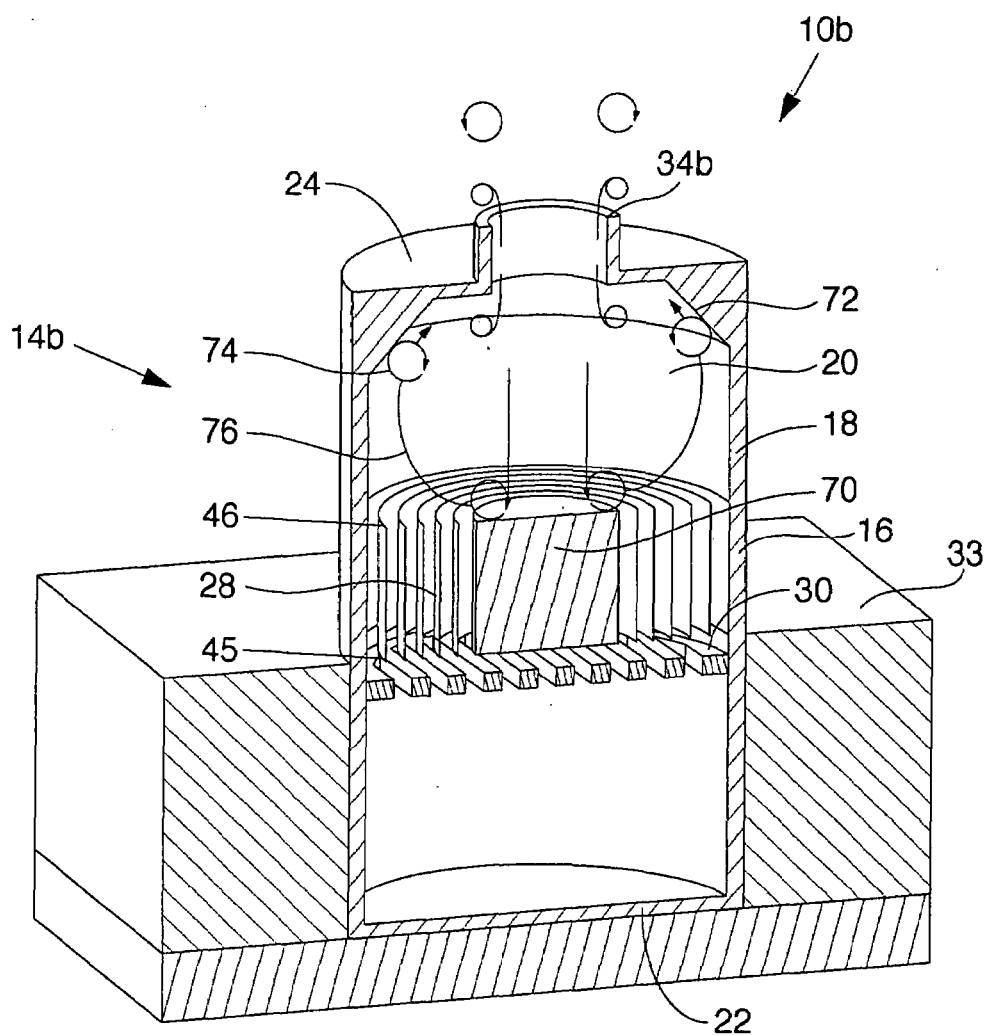
FIG. 5a is a schematic cross-sectional perspective view of the alternative embodiment thermoacoustic cooling system of FIG. 5 with a resonator having closed ends.

It will be understood that the resonator 16 may be formed such that one end of the resonator 16 may be open and one end may be enclosed by the wall 18, as shown in FIGS. 1, 4a, and 5a. Alternatively, the resonator 16 may be formed such that both the first end 22 and the second end 24 are enclosed by the wall 18, as shown in FIG. 1b. Also, embodiments of the resonator 16 may configured such that the wall 18 defines an opening at both ends as disclosed in FIGS. 4 and 5. It will also be understood that one or both the ends of the resonator 16 may be enclosed by structure other than the wall 18, such as the object to be cooled or chip 12.

It will be appreciated that the wall 18 of the resonator 16 may be formed of various different materials within the scope of the present disclosure. For example, any suitable rigid material that is capable of withstanding the temperatures generated by the object to be cooled may be used. One embodiment of the wall 18 may be formed of a stainless steel material, for example. Alternatively, the wall 18 may be formed of any other suitable metal, or any suitable non-metal material.

Figure 6A:
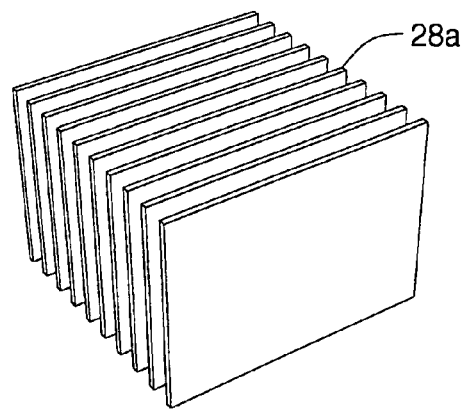
FIG. 6a is a schematic perspective view of a stack formed of substantially parallel plates.

The thermoacoustic engine 14 may also include a stack 28 positioned inside the resonator 16. The stack 28 may have various different configurations within the scope of the present disclosure, such as stacks 28a-28h, as shown in FIGS. 6a-6h, respectively. For example, as best shown in FIG. 6a, the stack 28a may be configured as a series of thin, well spaced plates aligned substantially parallel to a longitudinal axis 26 of the chamber 20 and resonator 16. The stack 28a may also be formed from a bank of etched plates. For example, the stack 28a may be formed of "micro-machined" channels in silicon, as known to those having ordinary skill in the relevant art.

Figure 6B:
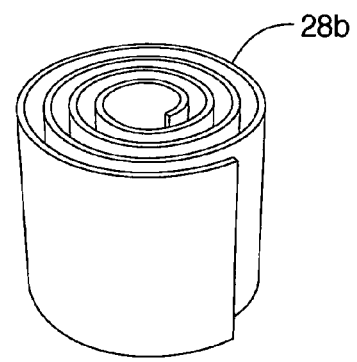
FIG. 6b is a schematic perspective view of a stack formed of a spiral plate.
Figure 9:
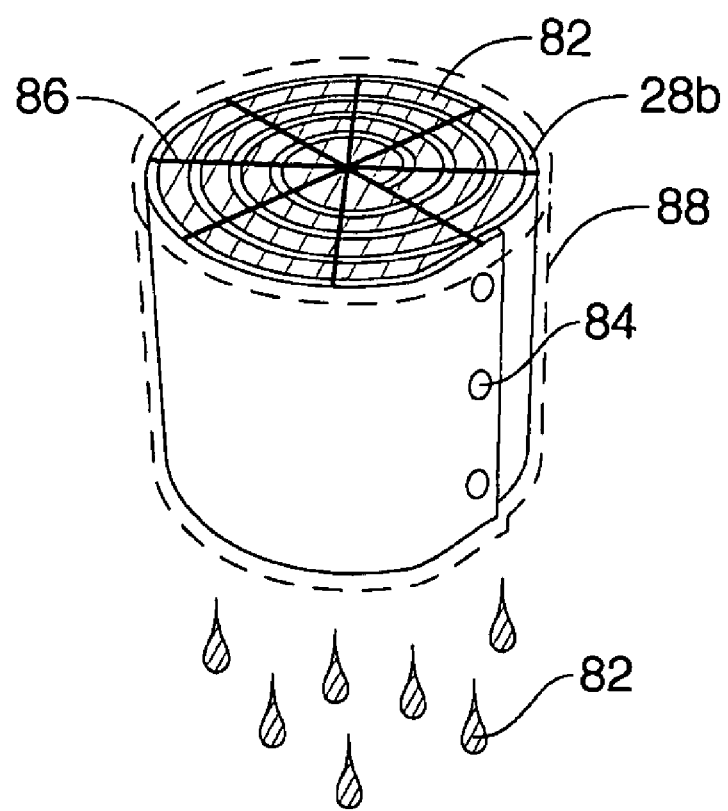
FIG. 9 is a schematic perspective view of the stack of FIG. 6b as it is being formed with a sacrificial material.

Alternatively, as shown in FIG. 6b, the stack 28b may be configured in the form of a spiral member. As shown in FIG. 9, the spiral member may be formed by sizing a suitable stack material 80, such as stainless steel, and placing a layer of sacrificial material 82, such as lead, on the stack material 80 such that no space resides between the stack material 80 and the sacrificial material 82. The stack material 80 and sacrificial material 82 may be rolled together and heated such that the sacrificial material 82 melts and runs out leaving the spiral member of the stack material 80. It will be understood that the roll of stack material 80 may be placed in a sleeve or wrapper 88, as shown in phantom line in FIG. 9, in lieu of or in addition to a brace 86, to maintain the spiral shape, or the roll of stack material 80 may be tacked together, by one or more welds 84 for example, prior to removal of the sacrificial material 82. One method of holding the roll of stack material 80 together may involve forming the brace 86, by placing a powdered metal material on the stack 28b and welding or sintering the powdered metal with a laser, for example, such that the welded metal holds the stack material 80 in position. A cut may be placed in the stack material 80 such that the powdered metal may be placed in the cut to provide contact with three surfaces within the cut such that a stronger connection may be formed between the welded metal and the stack material 80.

Another method of holding the stack material 80 in place may involve forming the brace 86 of a plurality of crossing arms, and placing the brace 86 on an end of the stack material 80. The brace 86 may be formed of metal which may be brazed to the stack material 80 on an end of the spiral member to hold the stack material 80 in place. It will be understood that the above mentioned methods of holding the stack material 80 may be used alone or in combination. For example, the brace 86 may be used in combination with the one or more welds 84, or the brace 86 may be used without the one or more welds 84, or the one or more welds 84 may be used without the brace 86, for the purpose of holding the stack material 80 in place. It will be understood that various other methods of forming the stack 28b and holding the stack 28b together may be used within the scope of the present disclosure. It will also be understood that other sacrificial materials besides lead may be used, such as copper or plastics. Moreover, other methods of removing the sacrificial material may be used. For example, the sacrificial materials may be etched away, or lasers or chemical washes may be used to remove the sacrificial material 82 from the stack material 80.

Figure 6C:
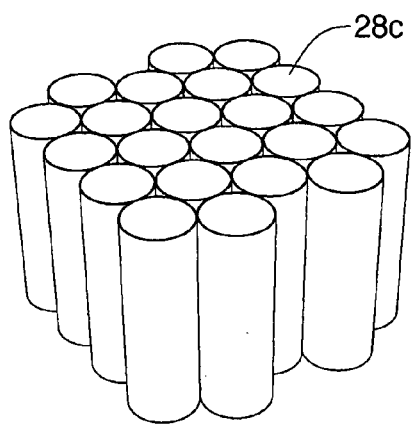
FIG. 6c is a schematic perspective view of a stack formed of a plurality of rods.
Figure 6D:
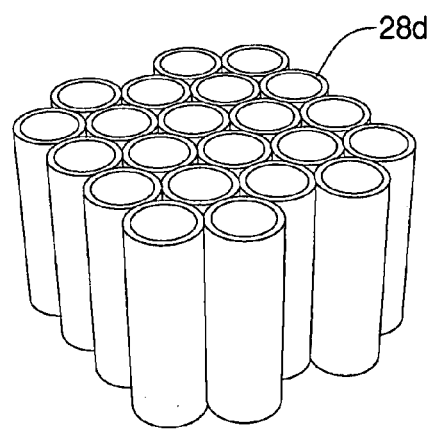
FIG. 6d is a schematic perspective view of a stack formed of a plurality of tubes.
Figure 6E:
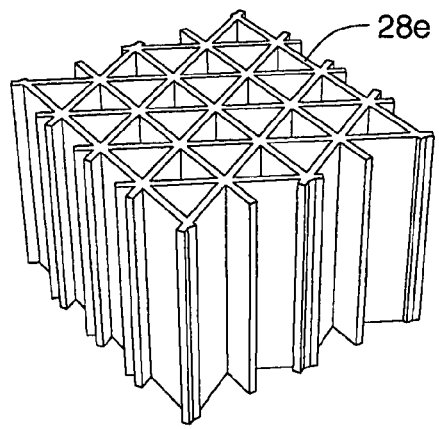
FIG. 6e is a schematic perspective view of a stack formed of a triangular grid.
Figure 6F:
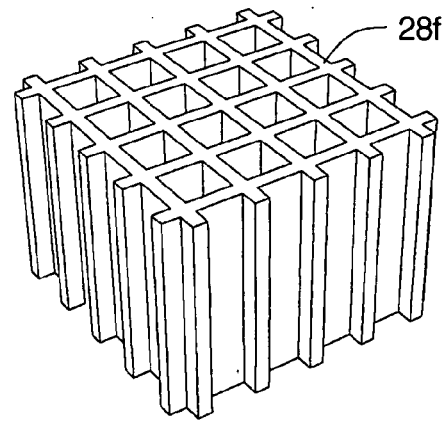
FIG. 6f is a schematic perspective view of a stack formed of a square grid.
Figure 6G:
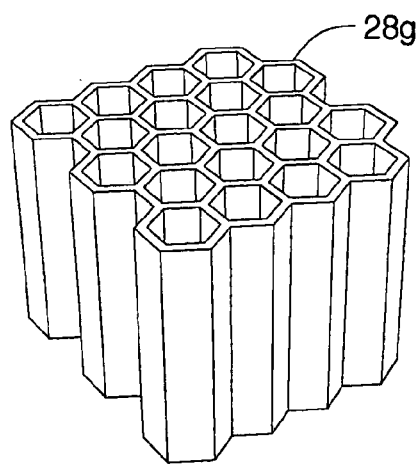
FIG. 6g is a schematic perspective view of a stack formed of a hexagonal grid.
Figure 6H:
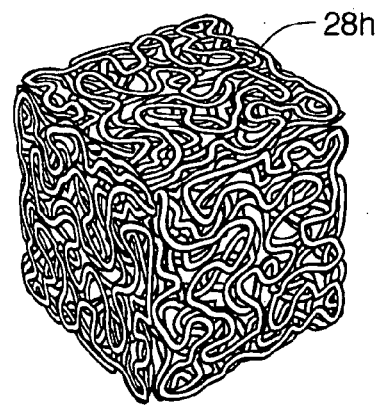
FIG. 6h is a schematic perspective view of a tortuous path stack.

It will also be understood that a stack 28c may be formed as a plurality of rods as shown in FIG. 6c, or a stack 28d may be formed as a plurality of tubes as shown in FIG. 6d. Also, stacks may be formed in various other configurations such as polygonal grids, including a triangular grid stack 28e, a square grid stack 28f, or a hexagonal grid stack 28g, as shown in FIGS. 6e-6g, respectively. Additionally, a tortuous path stack 28h may be formed as shown in FIG. 6h, or any other configuration of stack known to those skilled in the art may be utilized within the scope of the present disclosure to provide a channel to allow fluid to flow from one end of the stack to another. It will be understood that as referred to herein, the reference numeral 28 refers to the stack in general without regard to a specific configuration, including any of the stacks 28a-28h. The stack 28 may be configured to withstand the largest temperature generated by the chip 12 with minimal heat conduction. It will be appreciated that the stack 28 may be formed of various materials known in the art suitable for forming the stack 28.

Heat from the object to be cooled, such as the chip 12, may be transferred to the stack 28 in any manner known in the art, or by using any suitable heat-transferring device whether now known or later discovered. For example, the stack 28 may be positioned directly on the chip 12 such that heat from the chip 12 may be transferred to the stack 28 due to the contact between the chip 12 and the stack 28. Alternatively, a first heat exchanger 30, may be positioned near the stack 28 on a hot end 45 of the stack 28, and a thermal conducting material 33, such as copper, may be placed on the object to be cooled, such as the chip 12. The first heat exchanger 30 may be placed in a position in the thermoacoustic engine 14 so as to allow the first heat exchanger 30 to heat the fluid in the chamber 20 at the hot end 45 of the stack 28, and to avoid blocking the flow of fluid into the stack 28. The first heat exchanger 30 may also be formed of a material to conduct heat, such as copper.

Figure 8A:
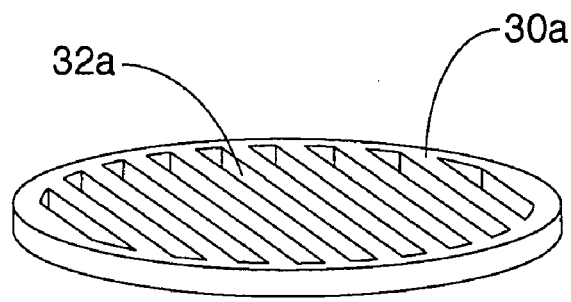
FIG. 8a is a perspective view of one embodiment of a heat exchanger in accordance with the principles of the present disclosure.
Figure 8B:
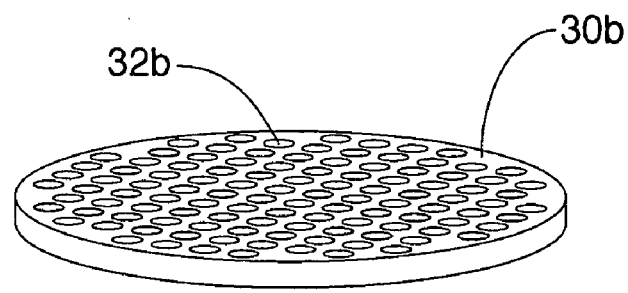
FIG. 8b is a perspective view of an alternative embodiment of a heat exchanger.
Figure 8C:
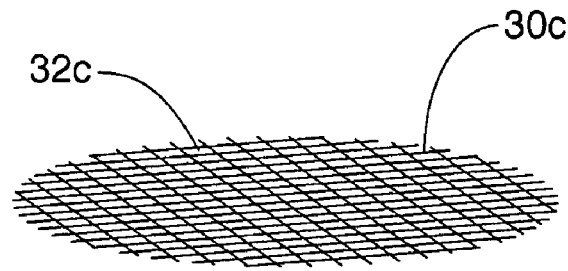
FIG. 8c is a perspective view of an additional alternative embodiment of a heat exchanger.

The first heat exchanger 30 may have holes 32 inside the engine 14 to allow air flow therethrough. Thus, the first heat exchanger 30 may be formed in various configurations such as a grate-like heat exchanger 30a, as best shown in FIG. 8a, having elongate holes 32a. Alternatively, a heat exchanger 30b may be formed having circular holes 32b, as best shown in FIG. 8b. Also, a heat exchanger 30c may be formed as a screen of interwoven wires, for example. The heat exchanger 30c may have square openings or holes 32c, as best shown in FIG. 8c. It will be understood that the first heat exchanger 30 may have various other shapes compatible with the stack 28, and that the holes 32 may be formed in various other configurations within the scope of the present disclosure.

The first heat exchanger 30 may serve to maintain a high temperature at the hot end 45 of the stack 28 by transferring heat from the object to be cooled, such as chip 12. It will be understood that an alternative embodiment of the present disclosure may include an external heating means for heating the hot end 45 of the stack 28, in which heat is supplied from a source other than an object 12 to be cooled. Such an alternative embodiment may be used for any desired purpose, including use of the thermoacoustic engine 14 as an actuator, in which a synthetic jet produced operates to actuate something. Accordingly, the thermoacoustic engine 14 may be utilized to fulfill other purposes in addition to cooling objects, such as creating a synthetic jet for various uses, including uses known to those skilled in the relevant art. It will be understood that any suitable external heating means known to those skilled in the art may be used in accordance with the principles of the present disclosure. The side of the stack 28 opposite the first heat exchanger 30 may be in contact with the working fluid in the chamber 20 to form a cold end 46 of the stack 28.

Heat may be transferred from an object such as the chip 12 through the first heat exchanger 30 into the stack 28 and the chamber 20. One or more orifices 34 or slits may be formed in the wall 18 for providing a passageway for the working fluid to pass from the chamber 20 to a position outside the resonator 16. It will be understood that the term "orifices" as used herein shall be interpreted broadly to include any variety of openings, slits, or passages, without limitation to size, shape or configuration. In one embodiment, the one or more orifices 34 may be positioned on the wall 18 near the stack 28. However, it will be appreciated by those having skill in the relevant art, that the one or more orifices 34 may be located on the wall 18 on the second end 24 of the resonator 16, or at other positions on the resonator 16 within the scope of the present disclosure.

As shown in FIG. 1a, which shows a graphical representation of the temperature T of the thermoacoustic cooling system 10, the ambient fluid may have a temperature To and the chip 12 may have a temperature $T_{chip}$. As heat moves from the chip 12 into the first heat exchanger 30, acoustic power may be generated in the stack 28 and converted to mean motions by the one or more orifices 34 in the wall 18. This mean flow may bring ambient fluid at temperature $T_0$ into the thermoacoustic engine 14 to cool the stack 28. The rejected heat may be carried out of the thermoacoustic engine 14 by the same mean motion. Accordingly, the temperature of the thermoacoustic cooling system 10 at the second end 24 may approach the ambient fluid temperature $T_0$.

One exemplary embodiment of the thermoacoustic engine 14 may include a type of standing wave engine. The thermoacoustic engine 14 may include a tube or resonator 16 that may be approximately one half a wavelength long, or any other multiple of one half, such as approximately 1.5, 2.5, etc. As shown most clearly in FIG. 2, which shows a schematic view of a thermoacoustic engine 14, the working fluid in the chamber 20 may have a velocity amplitude, as represented by the graphical representation at 25 with respect to the axis 26. Fluid at the first end 22 and the second end 24 of the resonator 16 may have velocity "nodes" 38, or points with virtually zero amplitude of velocity. Whereas the working fluid near a center 27 of the resonator 16 may have a velocity antinode 42, or a point of maximum amplitude between adjacent nodes.

The working fluid in the chamber 20 may have a pressure amplitude as represented graphically at 29. Pressure antinodes 44, or points of maximum amplitude, may be located at the first end 22 and second end 24 of the resonator 16 coinciding with the velocity nodes 38. A pressure node 40 may be located near the center 27 of the resonator 16 coinciding with the velocity antinode 42.

A tube such as the resonator 16 will resonate in such a way that one half of a wavelength resides in the tube. The wavelength of an oscillation of a sound wave is a function of the speed of sound, approximately 300 meters per second for atmospheric air, and the frequency of operation. Specifically, the wavelength λ is equal to a/f where a is the speed of sound and f is the frequency. Therefore, the overall length of the engine, L, is equal to 300/2f. Since the speed of sound is fixed for atmospheric air when the temperature is constant, and assuming that the air temperature variation inside the thermoacoustic engine 14 is too small to significantly alter the speed of sound, the length of the engine L is the only parameter that determines the operating frequency f.

The stack 28 may be positioned in the resonator 16 in a location with significant velocity, but much lower velocity than at the antinode 42. This position minimizes viscous losses through the stack 28 and heat exchangers.

Acoustic work (and per unit time, power) is generated when a parcel of the working fluid, such as air, inside the stack 28 expands while pressure is high or contracts when pressure is low. This occurs if the parcel of working fluid undergoes a density cycle and a pressure cycle that are ninety degrees out of phase. The density cycle is generated by varying the temperature in a cyclic fashion, which occurs due to the motion of the parcel of working fluid in the stack 28. The oscillating motion of the parcel of working fluid in the stack 28 is caused spontaneously when the temperature difference across the stack 28 becomes large enough. Everywhere in the resonator 16, pressure and velocity are approximately ninety degrees out of phase. This means that the pressure and the position of a given fluid parcel are in phase.

In order to cause the fluid to undergo a temperature cycle that lags position (and thus pressure) by ninety degrees, it is necessary that the thermal contact between the stack 28 and the air be rather poor. If this is the case, as the fluid parcel moves back and forth in the stack 28 (and the pressure varies at the same time and in phase with it) the fluid parcel's temperature (and thus density) vary somewhat behind its position.

A measure of thermal contact is the ratio of the stack pore size, r, to the thermal penetration depth, $\delta_k$. The thermal penetration depth $\delta_k$ may be described as the average distance over which a sound field interacts thermally with a body. The thermal penetration depth $\delta_k$ is a function of frequency ω and the thermal diffusivity k of the fluid: $\delta_k$ equals the square root of 2k/ω. Generally, standing wave engines operate best when the pore size is a few thermal penetration depths, such as within a range of approximately one to four thermal penetration depths for example. Therefore, once the working fluid and the frequency (length) are chosen, the optimal pore spacing may be fixed.

One embodiment of the thermoacoustic engine 14 may also include a second heat exchanger 31, as shown in dashed lines in FIG. 2. While the first heat exchanger 30 may serve to maintain the hot end 45 of the stack 28 at a high temperature, the second heat exchanger 31 may serve to maintain the cold end 46 of the stack 28 at a lower temperature. The heat supplied to the first heat exchanger 30 may be converted to oscillating power including the pressure amplitude 29 that is ninety degrees out of phase with the flow rate or velocity 25, while heat may be rejected by the second heat exchanger 31. The first heat exchanger 30 and the second heat exchanger 31 may straddle the stack 28.

However, as discussed above, the cold end 46 of the stack 28 may be maintained at a lower temperature by allowing ambient air into the resonator 16 through the one or more orifices 34 without the second heat exchanger 31. Since heat exchangers inherently create large amounts of entropy, eliminating the second heat exchanger 31 may result in a very significant increase in the efficiency of the thermoacoustic cooling system 10.

It will be understood that the thermoacoustic engine 14 may make an audible sound. It may therefore be desirable to configure the thermoacoustic engine 14 so as to operate beyond the range of human hearing, whether above or below the range of human hearing, or near a limit of the range of human hearing. For example, thermoacoustic engine 14 that is 0.9 centimeters long will operate at 17 Khz, which will be undetectable to most people. At this frequency, a pore spacing on the order of 0.1 millimeters or 0.004 inches would be required.

It will be understood that in one embodiment of the present disclosure, the thermoacoustic engine 14 may be configured to make a sound that is within the range of human hearing. This may allow the thermoacoustic engine 14 to operate as an alarm. As heat is generated by an object such as a chip 12, the thermoacoustic engine 14 may make a sound indicating to a user that the chip 12 is heated, that the thermoacoustic engine 14 is cooling the chip 12, or that the temperature of the chip 12 is within a particular range. For example, the thermoacoustic engine 14 may make a sound when the chip 12 is too hot, too cold, or at a desired temperature.

In one embodiment of the present disclosure as shown most clearly in FIG. 1, the one or more orifices 34 may include a plurality of small orifices formed in the resonator 16 to allow fluid inside the chamber 20 to be exchanged with ambient fluid outside the resonator 16. It will be understood by those having skill in the relevant art, that the location, configuration, quantity, and distribution of the one or more orifices 34 shown in FIG. 1 is schematic and for illustrative purposes only, and that various different locations, configurations, quantities, and distributions of the one or more orifices 34 may be utilized within the scope of the present disclosure. For example, it will be understood that the one or more orifices 34 may be located in various locations in the resonator 16 such as in the wall 18 near the stack 28 extending radially or transverse to the axis 26, or in the second end 24 of the resonator 16 extending substantially parallel to the axis 26, or in various other locations. Providing the one or more orifices 34 with a small size may prevent the one or more orifices 34 from becoming significant to the acoustics or frequency of the thermoacoustic engine 14. The distribution of the one or more orifices 34 may allow them to be oriented in such a way as to cancel sound generated by the one or more orifices 34 and to minimize vibrations.

The flow of the working fluid through the one or more orifices 34 may create a synthetic jet, as indicated by reference numeral 36 in FIG. 1. An exemplary flow path of the cold working fluid coming into the engine may be depicted as shown at 37. A synthetic jet as referred to herein may be described as a mean fluid motion generated by high-amplitude oscillatory flow through an orifice or nozzle. Synthetic jets have a zero-net-mass-flux nature, in which the fluid is circulated such that the flow of fluid out of an opening is equal to the flow of fluid into the opening. Accordingly, the one or more orifices 34 may be configured as known to those of ordinary skill in the relevant area of the art, and as discussed in the following publications which are hereby incorporated herein by reference in their entireties: Barton L. Smith, Mark A. Trautman, and Ari Glezer, Controlled Interactions of Adjacent Synthetic Jets, American Institute of Aeronautics and Astronautics, AIAA 99-0669; and Barton L. Smith and Gregory W. Swift, Synthetic Jets at Large Reynolds Number and Comparison to Continuous Jets, American Institute of Aeronautics and Astronautics, AIAA 2001-3030, such that the thermoacoustic engine 14 produces power to form a synthetic jet 36 at each of the one or more orifices 34 to move the heated air in the chamber 20 away from the thermoacoustic engine 14, and allow ambient air to be drawn into the chamber 20. As such, the one or more orifices 34 may constitute part of a means for forming a synthetic jet for transporting a flow of fluid out of the chamber 20 of the thermoacoustic engine 14. The second law of thermodynamics requires that any cyclic heat engine reject heat to a lower temperature. In the present disclosure, heat may be rejected to the ambient, and the transfer of heat may be aided by the flow generated by the synthetic jet 36.

Figure 3:
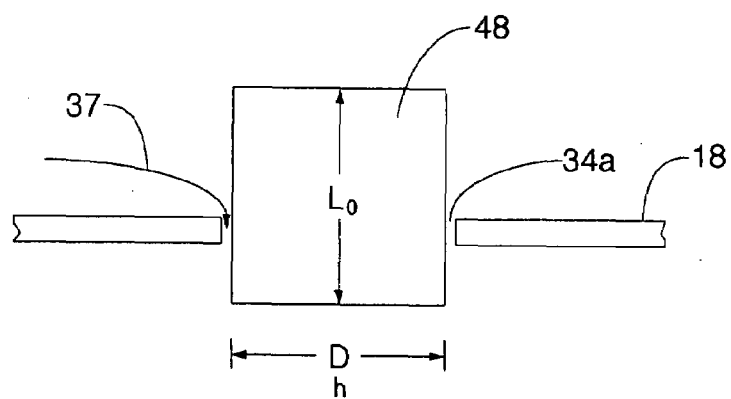
FIG. 3 is an enlarged breakaway schematic view of an orifice in a thermoacoustic engine.
Figure 3A:
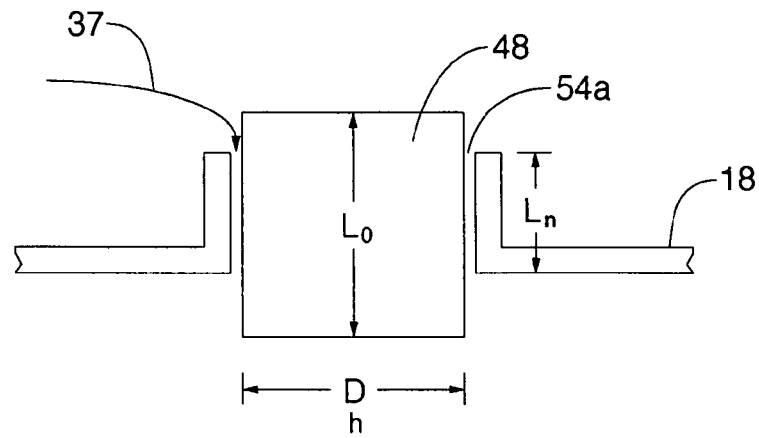
FIG. 3a is an enlarged breakaway schematic view of an orifice in an alternative embodiment thermoacoustic engine.

As shown in FIG. 3, which shows an enlarged breakaway schematic view of an orifice 34a in a thermoacoustic engine 14. The orifice 34a may be axisymmetric having a diameter D. Also, a stroke length $L_o$ may be defined as the length of a slug of fluid 48 pushed from the orifice 34a during a blowing stroke. The blowing stroke may be described as a portion of the oscillation of the fluid in the resonator 16 which forces fluid out the orifice 34a. The slug of fluid 48 and the stroke length $L_o$ are understood by, and may be determined by, those having ordinary skill in the relevant area of the art and as discussed in the above cited publications by Barton L. Smith in the American Institute of Aeronautics and Astronautics publications. It will be understood that in one embodiment of the present disclosure, as illustrated in FIG. 3a, the orifice 34a may include a neck length $L_n$. The stroke length $L_o$ and the neck length $L_n$ may be configured such that a ratio of the stroke length $L_o$ over the neck length $L_n$ is greater than 1.

For an axisymmetric orifice of diameter D, a synthetic jet forms when $L_o/D$ is greater than 1. Below this level, a slug of fluid 48, such as a vortex ring, may form, but it is ingested during a suction stroke, or portion of the oscillation which draws a fluid into the orifice 34a. A synthetic jet 36 may be formed when each slug of fluid 48 or vortex ring that is ejected during the blowing stroke propagates downstream with sufficient speed to be out of the influence of the sink-like flow 37 during the suction stroke. Accordingly, the orifice 34a may be configured such that $L_o/D$ is greater than 1 such that a synthetic jet 36 may be formed.

Embodiments of the one or more orifices 34 that are not axisymmetric may have a cross stream orifice width h rather than a diameter D. However, it will be appreciated that the side schematic view depicted in FIG. 3 is applicable to embodiments of the one or more orifices 34 that are either axisymmetric or non-axisymmetric. Accordingly, both the diameter D and the width h are shown in FIG. 3. For embodiments of the one or more orifices 34 that are non-axisymmetric, a synthetic jet may form when a ratio of the stroke length $L_o$ over the width h is greater than some threshold. It will be appreciated that the one or more orifices 34 may be configured in any manner such that the ratio $L_o/h$ is greater than this threshold so that a synthetic jet may be formed. In one exemplary embodiment, the synthetic jet formation threshold may be nominally constant and in the neighborhood of $1<L_o/h<10$. More specifically, the synthetic jet formation threshold may be in the range of $3<L_o/h<8$, or $5.5<L_o/h<6.0$. It will be understood that the synthetic jet 36 may be pulsatile at locations close to the one or more orifices 34, whereas the synthetic jet 36 may be indistinguishable from a steady flow jet at increasing distances from the one or more orifices 34.

Those skilled in the art will understand that the thermoacoustic cooling system 10 may include any number of thermoacoustic engines 14 joined with the object to be cooled. Accordingly, where increased cooling capacity is needed, additional thermoacoustic engines 14 may be joined with the object to be cooled.

It will be understood that the thermoacoustic cooling system 10 may be configured, in one embodiment, to transfer heat from the first heat exchanger 30 to the fluid at the cold end 46 of the stack 28. Accordingly, the chip 12 may only be cooled to a temperature as low as the temperature at the cold end 46 of the stack 28, which may be ambient temperature. This feature may differ from prior art thermoacoustic cooling systems which require power to operate a refrigerator. Such systems may generate temperatures that may be lower than ambient temperatures. However, it will be understood that an alternative embodiment of the present disclosure may include a stack cooling means to cool the cold end 46 of the stack 28 to temperatures below ambient temperatures. The stack cooling means may be formed in any manner known in the art and may be represented schematically by the second heat exchanger 31.

The thermoacoustic cooling system 10, using the thermoacoustic engine 14 may be configured to move heat away from the object to be cooled via forced air convection. The air motion may be generated from the heat dissipated by the object to be cooled. Therefore, the thermoacoustic cooling system 10 may be configured to operate with no external power. In fact, if an increase in power dissipation is experienced by the object to be cooled, the output of the thermoacoustic engine 14 may also increase thereby making the system inherently stable.

The performance efficiency of one embodiment of the present disclosure may be explained by the following example. Due to constraints imposed by the second law of thermodynamics, all heat engines have a theoretical upper bound on thermal efficiency that is a function only of the temperatures of the heat source and sink. This limit, called the Carnot Efficiency η, may be described by the following equation:

$$\eta = W/Q_{in} = 1 - T_{out}/T_{in},$$

where W is the power generated, $Q_{in}$ is the heat transfer into the machine, $T_{out}$ is the temperature of the sink, such as ambient temperature, and $T_{in}$ is the temperature of the source, such as chip 12, in Kelvin. Chips generally have a temperature limit near 80 degrees C., and the ambient is usually room temperature or 20 degrees C. Accordingly, the best one can hope for under these conditions is a 17% thermal efficiency (1−293/353=17%). Real devices do not generally approach this efficiency, which assumes no entropy generation. Standing wave engines have been constructed that have efficiencies as high as 23% of Carnot Efficiency, which in the present example would equal a thermal efficiency of 3.9% (23% of 17%). Although this may initially appear to be low, consider that common fans integrated into heat sinks consume power on the order of one Watt. Assuming a chip dissipates 100 Watts, and given the 3.9% thermal efficiency, 3.9 Watts would be available for the cooling flow. It will be appreciated that the chip 12 and ambient may have other temperatures, and that other efficiencies may result within the scope of the present disclosure.

It will be appreciated that the thermoacoustic engine 14 may have no moving parts. This feature may increase the reliability of the thermoacoustic cooling system 10 as compared to cooling systems having moving parts, since moving parts are commonly susceptible to wear and malfunction. Moreover, the reliability of the present disclosure may be further enhanced since no external power may be required other than the heat from the object to be cooled. External power sources are also susceptible to failure and depletion which may reduce the reliability of cooling systems that rely on the external power sources. It will be appreciated, however, that the thermoacoustic engine 14 may also be used in combination with other cooling mechanisms, such as fans, that have moving parts and/or require external power sources. In such instances, the reliability of the cooling system may be enhanced since fewer moving parts and less external power may be required.

Figure 7:
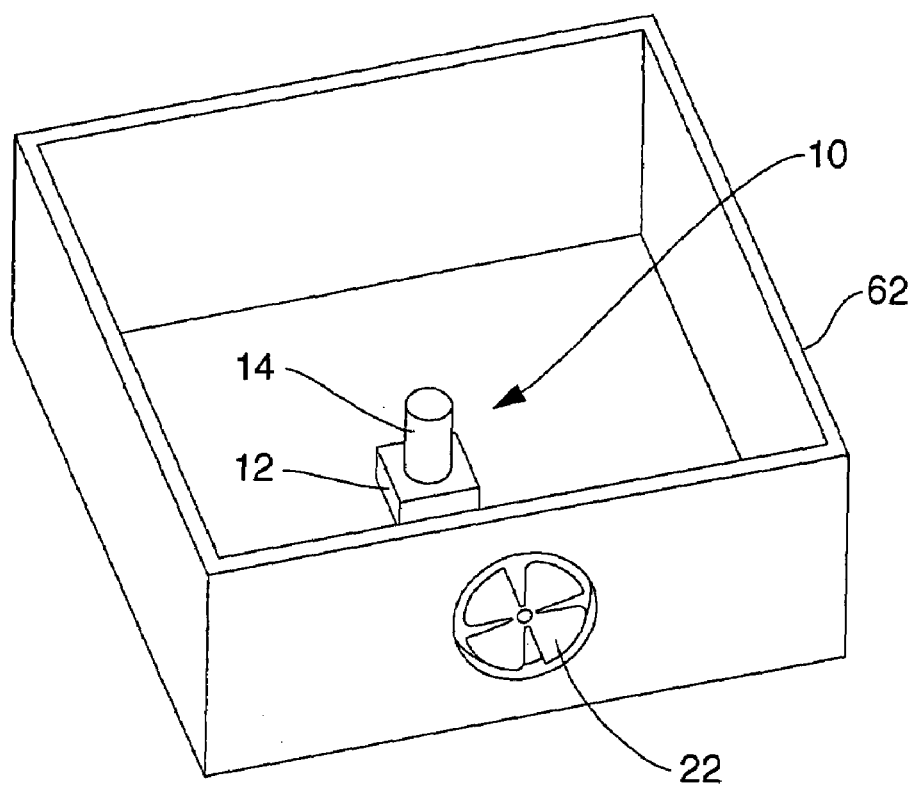
FIG. 7 is a schematic perspective view of thermoacoustic cooling system used with a fan in a computer housing.

An exemplary embodiment of the thermoacoustic cooling system 10 used in combination with a fan 60 is shown schematically in FIG. 7. The thermoacoustic cooling system 10 may be used to cool a chip 12 such as a central processing unit enclosed in a computer housing 62. The thermoacoustic engine 14 may be used to remove heat from the chip 12 as discussed above, and the fan 60 may be used to remove the heat from the housing 62. It will be understood that various different cooling means rather than the fan 60, or in addition to the fan 60, in various different configurations, may be used in combination with the thermoacoustic cooling system 10.

Reference will now to made to FIG. 4 to describe an alternative embodiment of the present disclosure. As previously discussed, the presently described embodiments of the disclosure illustrated herein are merely exemplary of the possible embodiments of the disclosure, including that illustrated in FIG. 4.

It will be appreciated that the alternative embodiment of the disclosure illustrated in FIG. 4 contains many of the same structures represented in FIGS. 1-3 and 6-9, and only the new or different structures will be explained to most succinctly explain the additional advantages which come with the embodiment of the disclosure illustrated in FIG. 4.

An alternative embodiment thermoacoustic cooling system, indicated generally at 10a, is shown schematically in FIG. 4. The alternative embodiment thermoacoustic cooling system 10a may include an alternate embodiment thermoacoustic engine 14a which may be made to vibrate like a Helmholtz resonator. Accordingly, the alternative embodiment thermoacoustic engine 14a may sometimes be referred to as a Helmholtz resonator. An example useful in describing a Helmholtz resonator is a container such as a bottle having an open neck. When air is blown over the open end of the bottle, a whistling sound is made. The air inside the bottle acts as a spring, and the air inside the neck of the bottle vibrates in and out against the spring. In contrast, the thermoacoustic engine 14 depicted in FIG. 1 may be configured such that the fluid in the chamber 20 near the first end 22 and the second end 24 acts as a spring as the fluid in the central portion of the chamber 20 oscillates back and forth.

In the alternative embodiment thermoacoustic engine 14a, the frequency of operation is a function of the container volume and the size (diameter and length) of the neck in the top. The shape of the container has no effect on the operation of the Helmholtz resonator, and therefore a single unit could be built to cover any area. Air may be exchanged with the environment through a single hole.

The alternative embodiment thermoacoustic engine 14a may include a neck 52 on the second end 24. The neck 52 may have various lengths within the scope of the present disclosure. One embodiment of the neck 52 may have a minimum length defined by a thickness of the wall 18. Other embodiments of the neck 52 may extend distances beyond the thickness of the wall 18. The neck 52 may include an orifice 54 providing a passage from the chamber 20 to the ambient. It will be understood that the configuration of the orifice 54 may have an impact on the frequency of operation of the alternative embodiment thermoacoustic engine 14a. Oscillating movement of the fluid across the stack 28 due to the differential temperature between the first heat exchanger 30 and the cool fluid in the chamber 20 may cause the fluid in the neck 52 to move in and out of the neck 52 as the fluid in the chamber 20 operates as a spring. Accordingly, a synthetic jet may be formed and heat may be transferred to the ambient outside the chamber 20.

In both the alternative embodiment thermoacoustic engine 14a as well as the exemplary embodiment thermoacoustic engine 14, heat moves from the object to be cooled into the first heat exchanger 30, if present, and into the stack 28. A small portion of the heat, such as a few percent, may be converted to acoustic power. The remainder of the heat may arrive at the cold end 46 of the stack 28 to be carried away by the motion of the ambient fluid flowing through openings in the chamber 20, and driven by the generated acoustic power in the chamber 20. As with the integrated fan/heat sink, it may then be necessary to move the heated fluid away from the device so that cool fluid may be ingested into the resonator 16.

Reference will now to made to FIG. 5 to describe an additional embodiment of the present disclosure. As previously discussed, the presently described embodiments of the disclosure illustrated herein are merely exemplary of the possible embodiments of the disclosure, including that illustrated in FIG. 5.

It will be appreciated that the additional embodiment of the disclosure illustrated in FIG. 5 contains many of the same structures represented in FIGS. 1-4 and 6-9 and only the new or different structures will be explained to most succinctly explain the additional advantages which come with the embodiments of the disclosure illustrated in FIG. 5.

The alternative embodiment system 10b of the disclosure shown in FIG. 5 may include a barrier 70 in the stack 28, and/or a taper 72 in the interior of the wall 18. It will be understood that the stack 28 may be positioned a distance from the orifice 34b such that as a vortex of fluid 74 is drawn into the chamber 20, the vortex will circulate within the chamber 20, as indicated by the path 76, to transfer heat out of the chamber 20. For example, one embodiment of the present disclosure includes a stack 28 positioned approximately one eighth of a wavelength from the first end 22 of the resonator 16. If the stack 28 is positioned too close to the orifice 34b, the vortex 74 may be drawn into the chamber 20, and expelled through the orifice 34b without circulating through the chamber 20. This may reduce the exchange of heat accomplished in the chamber 20. Also, if the vortex 74 impacts the stack 28, the vortex 74 may pass through the stack 28, thereby transferring heat from the cold end 46 of the stack 28 to the hot end 45 of the stack 28. This may create problems with the operation of the engine 14b. The barrier 70 may be formed as a solid member characterized by an absence of through passages. Also, the barrier 70 may be aligned with the orifice 34b and the barrier 70 may be sized and shaped so as to receive the impact of the vortex 74 to prevent the vortex 74 from flowing through the stack 28. The barrier 70 may direct the flow of the vortex 74 along the circulation path 76.

It will be understood that the taper 72 may provide the ability to independently vary the volume of the chamber 20 without varying other parameters of the thermoacoustic engine 14b, such as the wavelength. Also, the taper 72 may provide the ability to vary the position of a component with respect to a wavelength. The taper 72 may also serve to facilitate circulation of the vortex 74 through the chamber 20. The angle of the taper 72 may be configured to prevent the vortex 74 from sticking within the chamber 20 and to direct the vortex 74 to the orifice 34b. It will also be understood that the taper 72 may be formed in various different configurations, including linear surfaces formed at various different angles, or curved surfaces or concavities having various different radii of curvatures, or combinations of linear and curved surfaces. Moreover, it will be understood that the taper 72 may be formed beneath the stack 28 or on both ends of the resonator 16.

It will be appreciated that the structure and apparatus disclosed herein are merely examples of a means for forming a synthetic jet, and it should be appreciated that any structure, apparatus or system for forming a synthetic jet which performs functions the same as, or equivalent to, those disclosed herein are intended to fall within the scope of a means for forming a synthetic jet, including those structures, apparatus or systems for forming a synthetic jet which are presently known, or which may become available in the future. Anything which functions the same as, or equivalently to, a means for forming a synthetic jet, whether by converting heat to acoustic power or otherwise, falls within the scope of this element.

In accordance with the features and combinations described above, a useful method for cooling an object includes the steps of:

(a) joining a thermoacoustic engine with the object;

(b) using heat in the object to power the thermoacoustic engine; and (c) using the thermoacoustic engine to form a synthetic jet to move energy in the form of the heat away from the object.

Those having ordinary skill in the relevant art will appreciate the advantages provide by the features of the present disclosure. For example, it is a feature of the present disclosure to provide a cooling device which is simple in design and manufacture, which may have no moving parts. Another feature of the present disclosure is to provide such a cooling device that utilizes the heat that is to be removed to power the cooling device such that no additional energy is required to power the device. It is a further feature of the present disclosure, in accordance with one aspect thereof, to provide a cooling device that is reliable. It is an additional feature of the present disclosure to provide a cooling device that can be used without generating a sound that is perceptible to humans, or to provide a cooling device that generates a sound that can be used as an indicator.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A thermoacoustic device comprising:
    a thermoacoustic engine for moving a fluid using acoustic power, said thermoacoustic engine comprising a wall forming a chamber, said wall having one or more orifices formed therein;
    wherein said one or more orifices and said wall are sized and configured such that movement of said fluid by said thermoacoustic engine forms a synthetic jet at said one or more orifices.

2. The thermoacoustic device of claim 1, wherein said thermoacoustic engine comprises a stack.

3. The thermoacoustic device of claim 2, wherein said thermoacoustic engine comprises a first end, a second end and a center between said first end and said second end, and wherein said stack is positioned in said chamber between said first end and said center.

4. The thermoacoustic device of claim 2, wherein said stack comprises a series of spaced apart plates.

5. The thermoacoustic device of claim 4, wherein said spaced apart plates are aligned substantially parallel to a longitudinal axis of the chamber.

6. The thermoacoustic device of claim 2, wherein said stack comprises a spiral member.

7. The thermoacoustic device of claim 2, wherein said stack comprises a plurality of rods.

8. The thermoacoustic device of claim 2, wherein said stack comprises a plurality of tubes.

9. The thermoacoustic device of claim 2, wherein said stack comprises a polygonal grid.

10. The thermoacoustic device of claim 2, wherein said stack comprises a triangular grid.

11. The thermoacoustic device of claim 2, wherein said stack comprises a square grid.

12. The thermoacoustic device of claim 2, wherein said stack comprises a hexagonal grid.

13. The thermoacoustic device of claim 2, wherein said stack comprises a tortuous path between a hot end of said stack and a cold end of said stack.

14. The thermoacoustic device of claim 2, wherein said stack comprises a plurality of channels in silicon.

15. The thermoacoustic device of claim 2, wherein said thermoacoustic engine is configured such that said fluid is allowed to contact said stack at approximate ambient temperatures to form a cold end of said stack.

16. The thermoacoustic device of claim 1, wherein said thermoacoustic engine comprises a first end and a second end, and wherein said first end of said thermoacoustic engine is configured to be joined with an object to be cooled.

17. The thermoacoustic device of claim 1, wherein said thermoacoustic engine has a length and a width, wherein said length is longer than said width.

18. The thermoacoustic device of claim 1, wherein said thermoacoustic engine comprises a first heat exchanger.

19. The thermoacoustic device of claim 18, wherein said first heat exchanger is formed of a heat conducting material.

20. The thermoacoustic device of claim 18, wherein said first heat exchanger comprises holes inside the thermoacoustic engine to allow said fluid to flow therethrough.

21. The thermoacoustic device of claim 15, wherein said thermoacoustic engine comprises a first heat exchanger located on a hot end of said stack positioned opposite said cold end of said stack.

22. The thermoacoustic device of claim 21, wherein said first heat exchanger is formed as a screen.

23. The thermoacoustic device of claim 1, wherein the thermoacoustic engine is configured to be disposed directly on an object to be cooled without an intervening heat exchanger.

24. The thermoacoustic device of claim 1, wherein said one or more orifices comprise a plurality of orifices.

25. The thermoacoustic device of claim 24, wherein said thermoacoustic engine comprises a longitudinal axis and said plurality of orifices are formed in said wall in an orientation transverse to said longitudinal axis.

26. The thermoacoustic device of claim 1, wherein said thermoacoustic engine has a stroke length, and said one or more orifices each have a diameter, and wherein a ratio of said stroke length over said diameter is greater than 1.

27. The thermoacoustic device of claim 1, wherein said thermoacoustic engine has a stroke length, and said one or more orifices each have a cross stream width, wherein a ratio of said stroke length over said cross stream width is between approximately 1 and approximately 10.

28. The thermoacoustic device of claim 1, wherein said thermoacoustic engine has a stroke length, and said one or more orifices each have a cross stream width, wherein a ratio of said stroke length over said cross stream width is between approximately 3 and approximately 8.

29. The thermoacoustic device of claim 1, wherein said thermoacoustic engine has a stroke length, and said one or more orifices each have a cross stream width, wherein a ratio of said stroke length over said cross stream width is between approximately 5.5 and approximately 6.0.

30. The thermoacoustic device of claim 16, wherein said one or more orifices are located in said second end of said thermoacoustic engine.

31. The thermoacoustic device of claim 2, wherein said stack comprises a barrier to prevent said fluid from passing through said stack at said barrier.

32. The thermoacoustic device of claim 1, wherein said wall comprises a taper for reducing a volume of said chamber and directing movement of said fluid in said chamber.

33. A thermoacoustic engine for cooling an object, said thermoacoustic engine comprising:
    a resonator configured and dimensioned for generating acoustic power, said resonator having a wall defining a chamber;
    a stack positioned within said chamber, said stack having a hot end and a cold end; and
    a first heat exchanger disposed on said hot end of said stack;
    wherein said cold end of said stack contacts a fluid within said chamber without an intervening second heat exchanger such that heat is transferred from said stack to said fluid.

34. The thermoacoustic engine of claim 33, further comprising one or more orifices in said wall for forming a synthetic jet such that said fluid is allowed to pass from said chamber to a position outside of said chamber.

35. The thermoacoustic engine of claim 33, wherein said thermoacoustic engine comprises a first end and a second end, and wherein said first end of said thermoacoustic engine is configured to be joined with an object to be cooled.

36. The thermoacoustic engine of claim 33, wherein said first heat exchanger comprises holes inside the thermoacoustic engine to allow said fluid to flow therethrough.

37. The thermoacoustic engine of claim 34, wherein said one or more orifices comprise a plurality of orifices.

38. The thermoacoustic engine of claim 37, wherein said thermoacoustic engine comprises a longitudinal axis and said plurality of orifices are formed in said wall in an orientation transverse to said longitudinal axis.

39. The thermoacoustic engine of claim 35, wherein said one or more orifices are located in said second end of said thermoacoustic engine.

40. The thermoacoustic engine of claim 33, wherein said stack comprises a barrier to prevent said fluid from passing through said stack at said barrier.

41. The thermoacoustic engine of claim 33, wherein said wall comprises a taper for reducing a volume of said chamber and directing movement of said fluid in said chamber.

42. A thermoacoustic cooling system comprising:
a thermoacoustic engine, said thermoacoustic engine comprising means for forming a synthetic jet for transporting a flow of fluid out of said thermoacoustic engine; and
an object to be cooled;
wherein said thermoacoustic engine is disposed on said object to be cooled such that heat produced by said object is carried through said thermoacoustic engine and away from said object by said synthetic jet.

43. The thermoacoustic cooling system of claim 42, wherein said thermoacoustic engine comprises a wall forming a chamber.

44. The thermoacoustic cooling system of claim 43, wherein said means for forming a synthetic jet comprises one or more orifices in said wall.

45. The thermoacoustic cooling system of claim 44, wherein said thermoacoustic engine comprises a longitudinal axis and said one or more orifices are formed in said wall in an orientation transverse to said longitudinal axis.

46. The thermoacoustic cooling system of claim 44, wherein said one or more orifices are located in an end of said thermoacoustic engine.

47. The thermoacoustic cooling system of claim 42, wherein said object to be cooled comprises a chip.

48. The thermoacoustic cooling system of claim 42, wherein thermoacoustic engine further comprises a stack.

49. The thermoacoustic cooling system of claim 48, wherein said stack has a hot end and a cold end and a first heat exchanger disposed on said hot end.

50. The thermoacoustic cooling system of claim 48, wherein said stack comprises a barrier to prevent said fluid from passing through said stack at said barrier.

51. The thermoacoustic cooling system of claim 43, wherein said wall comprises a taper for reducing a volume of said chamber and directing movement of said fluid in said chamber.

52. A thermoacoustic cooling system comprising:
a thermoacoustic engine, said thermoacoustic engine comprising a resonator having a wall defining a chamber, said thermoacoustic engine being disposed on a chip;
wherein one or more orifices are formed in said wall of said resonator for providing a passageway for fluid to pass from said chamber to a position outside of said chamber.

53. The thermoacoustic cooling system of claim 52, further comprising cooling means for cooling said thermoacoustic engine.

54. The thermoacoustic cooling system of claim 53, wherein said cooling means comprises a fan for moving said fluid outside said resonator.

55. The thermoacoustic cooling system of claim 52, further comprising external heating means for heating said thermoacoustic engine.

56. The thermoacoustic cooling system of claim 52, further comprising cooling means for cooling said thermoacoustic engine, and external heating means for heating said thermoacoustic engine.

57. The thermoacoustic cooling system of claim 52, wherein thermoacoustic engine further comprises a stack.

58. The thermoacoustic cooling system of claim 57, wherein said stack has a hot end and a cold end and a first heat exchanger disposed on said hot end.

59. The thermoacoustic cooling system of claim 48, wherein said stack comprises a barrier to prevent said fluid from passing through said stack at said barrier.

60. The thermoacoustic cooling system of claim 52, wherein said wall comprises a taper for reducing a volume of said chamber and directing movement of said fluid.

61. The thermoacoustic cooling system of claim 52, wherein said one or more orifices are configured for forming a synthetic jet.

62. A thermoacoustic cooling system comprising:
a thermoacoustic engine, said thermoacoustic engine comprising a resonator defining a chamber, said thermoacoustic engine being disposed on a chip; and
a first heat exchanger disposed on said chip;
wherein heat from said chip is carried through said first heat exchanger to power said thermoacoustic engine and cool said chip.

63. The thermoacoustic cooling system of claim 62, wherein said thermoacoustic engine comprises a wall and one or more orifices are formed in said wall for forming a synthetic jet.

64. The thermoacoustic cooling system of claim 62, further comprising cooling means for cooling said thermoacoustic engine.

65. The thermoacoustic cooling system of claim 64, wherein said cooling means comprises a fan for moving said fluid outside said resonator.

66. The thermoacoustic cooling system of claim 62, wherein thermoacoustic engine further comprises a stack.

67. The thermoacoustic cooling system of claim 66, wherein said stack has a hot end and a cold end and said first heat exchanger is disposed on said hot end.

68. The thermoacoustic cooling system of claim 66, wherein said stack comprises a barrier to prevent said fluid from passing through said stack at said barrier.

69. The thermoacoustic cooling system of claim 63, wherein said wall comprises a taper for reducing a volume of said chamber and directing movement of said fluid in said chamber.

70. A thermoacoustic cooling system comprising:
a thermoacoustic engine, said thermoacoustic engine comprising means for forming a synthetic jet for transporting a flow of fluid out of said thermoacoustic engine; and a fan for moving said fluid away from said thermoacoustic engine.

71. The thermoacoustic cooling system of claim 70, wherein said thermoacoustic engine comprises a wall forming a chamber.

72. The thermoacoustic cooling system of claim 71, wherein said means for forming a synthetic jet comprises one or more orifices in said wall.

73. The thermoacoustic cooling system of claim 70, wherein thermoacoustic engine further comprises a stack.

74. The thermoacoustic cooling system of claim 73, wherein said stack has a hot end and a cold end and a first heat exchanger is disposed on said hot end.

75. The thermoacoustic cooling system of claim 73, wherein said stack comprises a barrier to prevent said fluid from passing through said stack at said barrier.

76. The thermoacoustic cooling system of claim 71, wherein said wall comprises a taper for reducing a volume of said chamber and directing movement of said fluid in said chamber.

77. The thermoacoustic cooling system of claim 70, wherein said thermoacoustic engine is disposed on a chip.

78. A method for cooling an object, said method comprising the steps of:
(a) joining a thermoacoustic engine to said object;
(b) using heat in said object to power said thermoacoustic engine; and
(c) using said thermoacoustic engine to form a synthetic jet to move said heat away from said object.

79. The method of claim 78, wherein step (a) comprises joining said thermoacoustic engine to a chip.

80. The method of claim 78, wherein step (a) comprises placing a first heat exchanger on said object.

81. The method of claim 78, further comprising moving fluid in said thermoacoustic engine using acoustic power.

82. The method of claim 78, wherein said thermoacoustic engine comprises a stack having a hot end and a cold end, wherein the method further comprises the step of heating said hot end of said stack with said object.

83. The method of claim 82, further comprising cooling said cold end of said stack with ambient air.

84. The method of claim 82, further comprising cooling said cold end of said stack with a stack cooling means.

85. The method of claim 82, further comprising providing a first heat exchanger on said hot end of said stack.

86. The method of claim 78, further comprising circulating ambient air through said thermoacoustic engine with said synthetic jet.

87. The method of claim 78, further comprising operating said thermoacoustic engine at a frequency beyond a range detectable by human hearing.

88. The method of claim 78, further comprising forming a plurality of synthetic jets.

89. The method of claim 78, wherein said thermoacoustic engine comprises a longitudinal axis and wherein step (c) further comprises directing said synthetic jet in a direction transverse to said longitudinal axis.

90. The method of claim 78, wherein said thermoacoustic engine comprises a longitudinal axis and wherein step (c) further comprises directing said synthetic jet in a direction substantially parallel to said longitudinal axis.

91. The method of claim 82, further comprising forming a barrier on said stack.

92. The method of claim 78, further comprising directing a flow of fluid in said thermoacoustic engine.

93. The method of claim 78, further comprising reducing a volume of a portion of said thermoacoustic engine.

94. A method for cooling an object, said method comprising the steps of:
(a) joining a thermoacoustic engine to said object;
(b) using heat produced by said object to power said thermoacoustic engine; and
(c) transferring said heat through said thermoacoustic engine to move said heat away from said object.

95. The method of claim 94, further comprising forming a synthetic jet to transfer said heat through said thermoacoustic engine.

96. The method of claim 94, wherein step (a) comprises joining said thermoacoustic engine to a chip.

97. The method of claim 94, wherein step (a) comprises placing a first heat exchanger on said object.

98. The method of claim 94, further comprising moving fluid in said thermoacoustic engine using acoustic power.

99. The method of claim 94, wherein said thermoacoustic engine comprises a stack having a hot end and a cold end, wherein the method further comprises the step of heating said hot end of said stack with said object.

100. The method of claim 99, further comprising cooling said cold end of said stack with ambient air.

101. The method of claim 99, further comprising cooling said cold end of said stack with a stack cooling means.

102. The method of claim 99, further comprising providing a first heat exchanger on said hot end of said stack.

103. The method of claim 95, further comprising circulating ambient air through said thermoacoustic engine with said synthetic jet.

104. The method of claim 94, further comprising operating said thermoacoustic engine at a frequency beyond a range detectable by human hearing.

105. The method of claim 94, further comprising forming a plurality of synthetic jets to transfer said heat through said thermoacoustic engine.

106. The method of claim 95, wherein said thermoacoustic engine comprises a longitudinal axis and the method further comprises directing said synthetic jet in a direction transverse to said longitudinal axis.

107. The method of claim 95, wherein said thermoacoustic engine comprises a longitudinal axis and the method further comprises directing said synthetic jet in a direction substantially parallel to said longitudinal axis.

108. The method of claim 99, further comprising forming a barrier on said stack.

109. The method of claim 94, further comprising directing a flow of fluid in said thermoacoustic engine.

110. The method of claim 94, further comprising reducing a volume of a portion of said thermoacoustic engine.

111. A thermoacoustic device comprising:
a thermoacoustic engine comprising a wall forming a chamber, and a stack positioned in said chamber;
wherein said wall comprises one or more orifices and said stack comprises a barrier such that when a fluid flowing from said one or more orifices contacts said barrier, said fluid is directed to circulate in said chamber without passing through said stack.

112. The thermoacoustic device of claim 111, wherein each of said one or more orifices is configured for forming a synthetic jet for moving said fluid in and out of said chamber.

113. The thermoacoustic device of claim 111, wherein said stack comprises a series of spaced apart plates.

114. The thermoacoustic device of claim 111, wherein said stack comprises a spiral member.

115. The thermoacoustic device of claim 111, wherein said stack comprises a plurality of rods.

116. The thermoacoustic device of claim 111, wherein said stack comprises a plurality of tubes.

117. The thermoacoustic device of claim 111, wherein said stack comprises a polygonal grid.

118. The thermoacoustic device of claim 111, wherein said stack comprises a triangular grid.

119. The thermoacoustic device of claim 111, wherein said stack comprises a square grid.

120. The thermoacoustic device of claim 111, wherein said stack comprises a hexagonal grid.

121. The thermoacoustic device of claim 111, wherein said stack comprises a tortuous path between a hot end of said stack and a cold end of said stack.

122. The thermoacoustic device of claim 111, wherein said stack has a cold end and a hot end, and wherein said barrier prevents movement of said fluid from said cold end of said stack to said hot end of said stack at said barrier.

123. The thermoacoustic device of claim 111, wherein said thermoacoustic engine comprises a first end and a second end, and wherein said first end of said thermoacoustic engine is configured to be joined with an object to be cooled.

124. The thermoacoustic device of claim 111, wherein said thermoacoustic engine comprises a first heat exchanger.

125. The thermoacoustic device of claim 111, wherein said thermoacoustic engine comprises a longitudinal axis and said one or more orifices are formed in said wall in an orientation substantially parallel to said longitudinal axis.

126. The thermoacoustic device of claim 111, wherein said wall comprises a taper for reducing a volume of said chamber and directing movement of said fluid in said chamber.

127. A thermoacoustic device comprising:
a thermoacoustic engine comprising a wall forming a chamber, said wall comprising one or more orifices; and
a barrier in said chamber, said barrier being aligned with said one or more orifices such that when a fluid flowing from said one or more orifices contacts said barrier, said fluid is directed to circulate in said chamber.

128. The thermoacoustic device of claim 127, further comprising a stack in said chamber.

129. The thermoacoustic device of claim 128, wherein said barrier is formed on said stack.

130. The thermoacoustic device of claim 127, wherein said barrier is formed as a solid member characterized by an absence of through passages.

131. The thermoacoustic device of claim 127, wherein each of said one or more orifices is configured for forming a synthetic jet for moving said fluid in and out of said chamber.

132. The thermoacoustic device of claim 128, wherein said stack has a cold end and a hot end, and wherein said barrier prevents movement of said fluid from said cold end of said stack to said hot end of said stack at said barrier.

133. The thermoacoustic device of claim 127, wherein said thermoacoustic engine comprises a first end and a second end, wherein said first end of said thermoacoustic engine is configured to be joined with an object to be cooled and said one or more orifices are located in said second end.

134. The thermoacoustic device of claim 127, wherein said thermoacoustic engine comprises a first heat exchanger.

135. The thermoacoustic device of claim 127, wherein said thermoacoustic engine comprises a longitudinal axis and said one or more orifices are formed in said wall in an orientation substantially parallel to said longitudinal axis.

136. The thermoacoustic device of claim 127, wherein said wall comprises a taper for reducing a volume of said chamber and directing movement of said fluid.

137. A thermoacoustic device comprising:
a thermoacoustic engine comprising a wall forming a chamber, said chamber having an interior surface and one or more orifices in said wall;
wherein said interior surface tapers toward said one or more orifices to direct a flow of fluid toward said one or more orifices.

138. The thermoacoustic device of claim 137, further comprising a barrier in said chamber, said barrier being aligned with said one or more orifices.

139. The thermoacoustic device of claim 137, further comprising a stack in said chamber.

140. The thermoacoustic device of claim 137, wherein each of said one or more orifices is configured for forming a synthetic jet for moving said fluid in and out of said chamber.

141. The thermoacoustic device of claim 137, wherein said thermoacoustic engine comprises a first end and a second end, wherein said first end of said thermoacoustic engine is configured to be joined with an object to be cooled and said one or more orifices are located in said second end.

142. The thermoacoustic device of claim 137, wherein said thermoacoustic engine comprises a first heat exchanger.

143. A method for forming a stack, said method comprising the steps of:
(a) joining a stack material and a sacrificial material;
(b) rolling the stack material and the sacrificial material together; and
(c) removing the sacrificial material after the stack material and the sacrificial material are rolled together such that the stack material remains.

144. The method of claim 143, wherein the step of joining a stack material and a sacrificial material comprises joining stainless steel and lead.

145. The method of claim 143, further comprising brazing a brace on said stack material to hold said stack material in place.

146. A method for forming a stack, said method comprising the steps of:
(a) joining a stack material and a sacrificial material;
(b) rolling the stack material and the sacrificial material together; and
(c) removing the sacrificial material such that the stack material remains;
wherein the method further comprises brazing a brace on said stack material to hold said stack material in place;
wherein the step of brazing a brace further comprises forming a multi-arm brace and connecting arms of said multi-arm brace to edges of the stack material.

147. The method of claim 146, wherein the arms of the multi-arm brace extend in a radial direction with respect to the stack material in a rolled configuration.

148. The method of claim 143, further comprising sintering metal on said stack material to hold said stack material in place.

149. A method for forming a stack, said method comprising the steps of:
(a) joining a stack material and a sacrificial material;
(b) rolling the stack material and the sacrificial material together; and
(c) removing the sacrificial material such that the stack material remains;
wherein the method further comprises sintering metal on said stack material to hold said stack material in place;

wherein the step of sintering metal on said stack material further comprises forming a multi-arm brace and connecting arms of said multi-arm brace to edges of the stack material.

150. The method of claim 143, wherein step (c) comprises heating said sacrificial material to melt said sacrificial material away from said stack material.

151. The method of claim 143, wherein step (c) comprises chemically washing said sacrificial material away from said stack material.

152. The method of claim 143, further comprising holding said stack material together.

153. The method of claim 152, wherein holding said stack material together comprises placing said stack material in a sleeve.

154. The method of claim 152, wherein holding said stack material together comprises welding said stack material.

155. A thermoacoustic system comprising:
a thermoacoustic engine for moving a fluid using acoustic power, said thermoacoustic engine comprising a wall forming a chamber, said wall having one or more orifices formed therein;
wherein said one or more orifices and said wall are sized and configured such that movement of said fluid by said thermoacoustic engine forms a synthetic jet at said one or more orifices;
wherein said thermoacoustic engine comprises a stack;
wherein said stack comprises a spiral member;
wherein said thermoacoustic engine comprises a first end, a second end and a center between said first end and said second end, and wherein said stack is positioned in said chamber between said first end and said center;
wherein said thermoacoustic engine is configured such that said fluid is allowed to contact said stack at approximate ambient temperatures to form a cold end of said stack;
wherein said thermoacoustic engine comprises a first heat exchanger located on a hot end of said stack positioned opposite said cold end of said stack;
wherein said first heat exchanger is formed of a heat conducting material;
wherein said first heat exchanger comprises holes inside the thermoacoustic engine to allow said fluid to flow therethrough;
wherein said thermoacoustic engine has a length and a width, wherein said length is longer than said width;
wherein said one or more orifices comprise a plurality of orifices;
wherein said thermoacoustic engine comprises a longitudinal axis and said plurality of orifices are formed in said wall in an orientation transverse to said longitudinal axis;
wherein said thermoacoustic engine has a stroke length, and said plurality of orifices each have a cross stream width, wherein a ratio of said stroke length over said cross stream width is between approximately 5.5 and approximately 6.0;
wherein the first end of the thermoacoustic engine is joined with an object to be cooled;
wherein the object to be cooled is a chip.

156. The thermoacoustic device of claim 1, wherein said thermoacoustic engine comprises a first end and a second end, wherein said chamber is enclosed at said first end and said second end said wall.

157. The thermoacoustic device of claim 1, wherein said thermoacoustic engine comprises a first end and a second end, wherein said chamber is enclosed by said wall at one of said first end and said second end.

158. The thermoacoustic device of claim 1, wherein said thermoacoustic engine comprises a first end and a second end, wherein said wall defines an opening at each of said first end and said second end.

* * * * *